May 23, 1933.　　　　R. V. KISSEL　　　　1,910,108
TEMPER SCREW FEED
Filed Jan. 18, 1932　　　2 Sheets-Sheet 1

R. V. Kissel　INVENTOR
BY Victor J. Evans & Co.
ATTORNEY

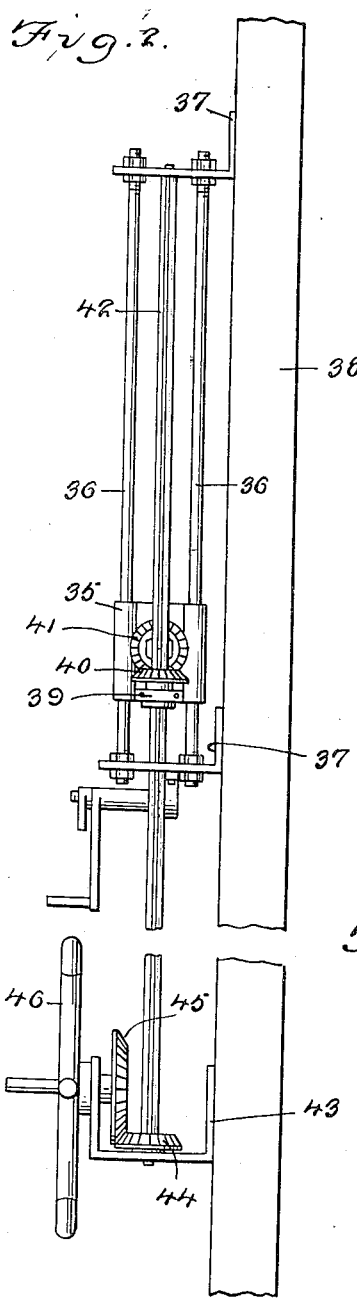
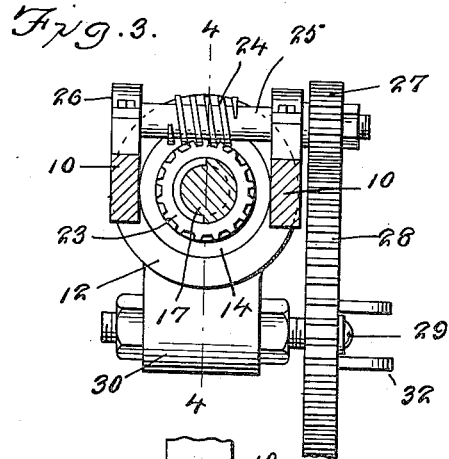
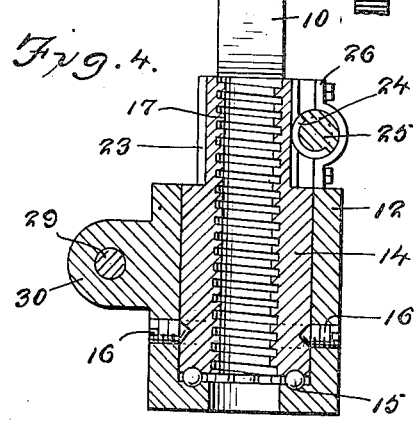
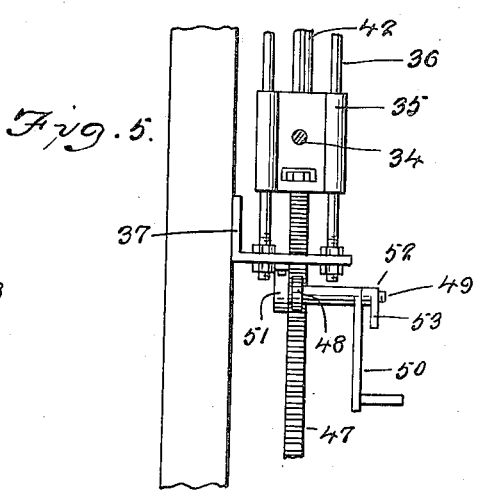

Patented May 23, 1933

1,910,108

UNITED STATES PATENT OFFICE

RALPH V. KISSEL, OF LIMA, OHIO, ASSIGNOR OF ONE-THIRD TO WILLIAM HARRY MOLTER, OF DELPHOS, OHIO

TEMPER SCREW FEED

Application filed January 18, 1932. Serial No. 587,436.

The object of the invention is to provide a device for use in connection with the temper screws of oil drilling derricks that will enable the driller to feed the screw while standing on the derrick floor, instead of on the derrick stool as is now usually the case by reason of the temper screw being at such a high elevation; to provide a temper screw in which the feed is effective by rotating the box or nut instead of the screw, so that no jockey stick is needed to hold the clamps in place or yoke screw employed to be overlooked by the tool dresser who, in the conventional practice, frequently forgets to tighten the yoke screw, thus permitting the temper screw to drop through the box when the driller starts the engine; and to provide a temper screw and operating means therefor which is of simple form and susceptible of cheap manufacture.

With this object in view, the invention consists in a construction and combination of parts of which a preferred embodiment is illustrated in the accompanying drawings but to which the invention is not to be restricted. Actual practical use may suggest certain changes or alterations and the right is claimed to make any which fall within the scope of the annexed claims.

In the drawings:

Figure 2 is an elevational view of the structure of Figure 1 but looking in a direction at right angles to the latter and at one side of the feeding means.

Figure 3 is a sectional view on the plane indicated by the line 3—3 of Figure 1.

Figure 4 is a sectional view on the plane indicated by the line 4—4 of Figure 3.

Figure 5 is a detail elevational view, looking from the opposite side from that shown in Figure 2 and illustrating the elevating and lowering means for changing the angle of inclination of the actuating shaft for the temper screw nut.

Figure 1:
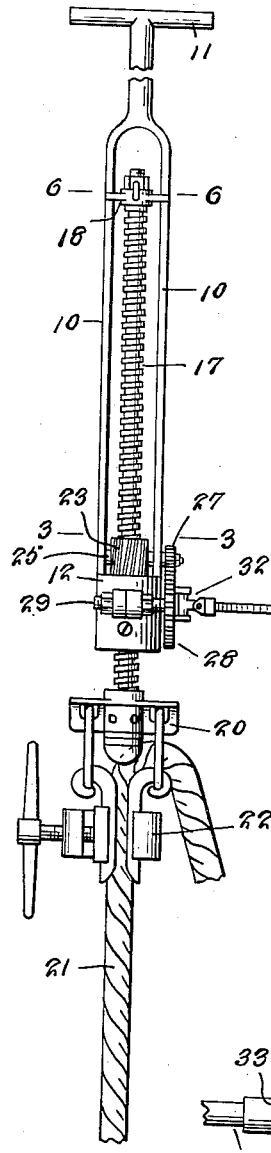
Figure 1 is a side elevational view of a temper screw and its actuating means constructed in accordance with the invention.
Figure 6:
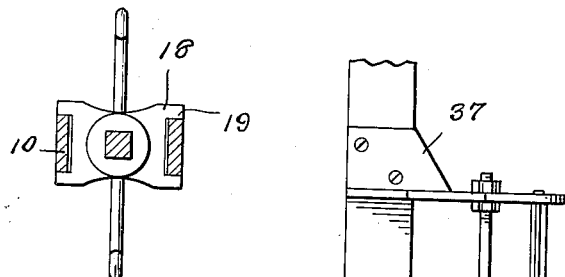
Figure 6 is a sectional view on the plane indicated by the line 6—6 of Figure 1.
Figure 7:
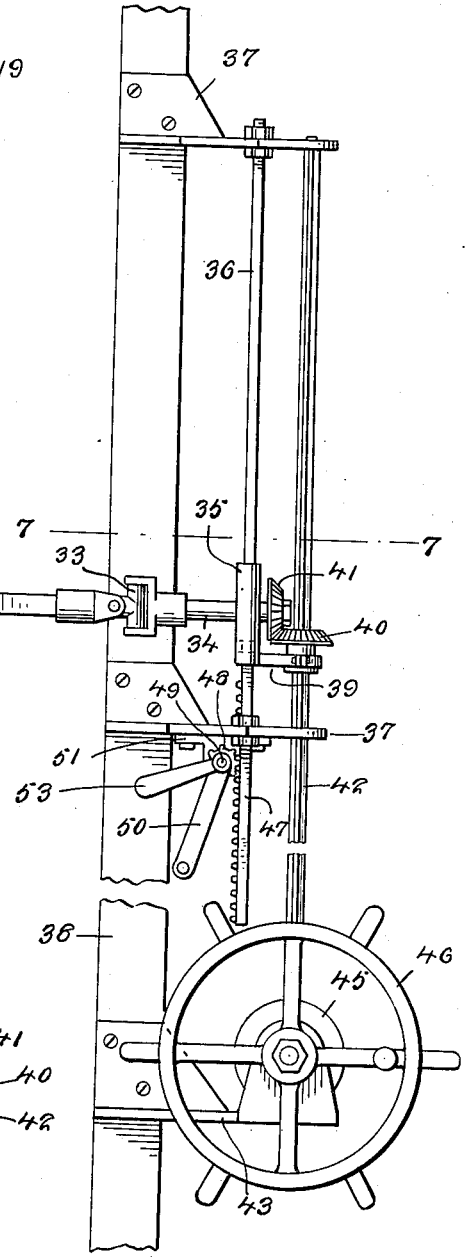
Figure 7 is a sectional view on the plane indicated by the line 7—7 of Figure 1.

The reins 10 are arranged in the usual parallel relation and at the upper end merge into a common shank with which the crosshead 11 is formed for connection to the walking beam of the well drilling apparatus. At the lower end of the reins 10 is hung the box 12 in which is disposed the temper screw actuating nut 14 seated on anti-friction thrust bearings 15. Blind set screws 16, threaded through the wall of the box 12, enter a peripheral groove in the nut 14 and retain it in its proper position in the box. The nut 14 threadingly engages a temper screw 17 which at its upper end has secured thereto a crosshead 18 having a sliding connection with the reins 10 as indicated at 19. The crosshead 18 is secured to the screw, so that the latter may not rotate with reference to the reins.

The temper screw at the lower end carries the hanger 20 by means of which the cable 21 is connected to the screw through the instrumentality of the cable clamp 22.

Since the screw may not turn or rotate with reference to the reins, its axial movement to effect feeding of the drilling tool is accomplished by rotating the nut 14 and to this end the latter is provided with a hub portion on the periphery of which is formed the worm gear 23 in mesh with a worm 24, the latter being formed on a shaft 25 journaled in bearings 26 carried by the reins. On the shaft 25 is mounted a pinion 27 which is in mesh with a gear 28, the latter being rotatably mounted on the stub shaft 29 supported in a lateral extension 30 formed on the box 12.

Since in a drilling operation, the temper screw as a whole must be permitted a certain amount of lateral movement, whereas the actuating means, if it is to be stationary, must provide for this, a longitudinally extensible connecting shaft 31 is employed consisting of the telescoping sections 31ª and 31ᵇ of which the former is connected by means of a universal joint 32 with the gear 28 and the latter connected by means of a universal joint 33 with a shaft 34, the latter being journaled in a bracket 35 slidably mounted on the guide rods 36 which are disposed in parallel relation and supported by bracket plates 37 from the derrick frame 38. The bracket 35 is formed with a lateral extension 39 in which is journaled a beveled gear 40 meshing with a beveled gear 41 on the shaft 34. The beveled gear 40 is mounted on a vertically disposed shaft 42 with respect to which it is axially but not angularly movable. Any acceptable means may be employed for mounting the gear 40 on the shaft 42, so that there may be relative longitudinal movement but not relative angular movement between the two, but in the present instance, the shaft 42 is shown as angular in cross section, having a bearing at the upper end in the upper bracket plate 37 and a bearing at its lower end in a bracket plate 43 also mounted on the derrick frame. The shaft 40 extends through a clearance opening in the lower bracket plate 37. To provide for manual rotation of the shaft 42, the latter is provided with a beveled gear 44 at its lower end which is in mesh with a beveled gear 45, the latter being mounted on a common shaft with a hand wheel 46, said shaft being journaled in a bearing formed in the bracket 43. Obviously rotation of the hand wheel will effect rotation of the cross sectional angular shaft 42 and thereby transmit angular or turning movement to the extensible shaft 31 by reason of the beveled gear connection 41—40 between the two.

The two sections of the extensible shaft are relatively axially movable but not relatively angularly movable, so that when rotation is imparted to the shaft 31, rotation of the nut 14 will follow with the result that the temper screw 17 will be moved axially, resulting in the lowering of the drilling tool as the drilling operation progresses. By this construction, the necessary movement to the temper screw nut may be secured by the operation of the hand wheel 46 disposed in convenient reach of the driller on the derrick platform and any adjustment of the temper screw nut will be uneffected by the reciprocatory movement of the walking beam because of the extensible form in which the connecting shaft 31 is designed.

The preferable position of the connecting shaft 31 is parallel with the axis of the walking beam, so that it will be extended to its greater length in the highest and lowest position of the walking beam in drilling. This relation of parts would be upset, were not some provision made for lowering the operative connections between the shaft 42 and shaft 31, if the temper screw were let out during the progress of the drilling operation. Therefore, the bracket 35 which supports the shaft 34 is made vertically adjustable on its guide rods 36 and to this end a rack bar 47 is employed, being connected with the bracket 35 but in pendent relation thereto and extending through the lower bracket 37. In mesh with the rack bar is a pinion 48 rotatably mounted on a stud 49 in common with a crank 50, the stud being carried in a mounting 51 carried by the lower bracket plate 37. Rotation of the crank 50 will effect rotation of the pinion 48 and therefore effect elevation or lowering of the bracket 35, depending on the direction in which the pinion is turned and the resultant direction of movement of the rack bar. To provide for maintaining any adjusted position of the bracket 35, the stud 49 is threaded at its extremity and on the threaded portion is carried a lock nut 52 formed with an actuating handle 53. Turning the lock nut in one direction releases the crank, while turning it in the other direction tightens the crank, so that after the adjustment of the bracket 35 to the proper position, the tightening of the nut 52 will maintain its adjusted position.

The invention having been described, what is claimed as new and useful is:

1. In a well drilling apparatus, a temper screw, spaced reins provided with means for suspension from a walking beam, a cross-sectionally annular box with which the reins connect at their lower ends, a cylindrical nut disposed in and slidably engaging the wall of said box, an anti-friction bearing disposed on the bottom of the box and taking the thrust of the nut, the nut threadingly engaging the temper screw, and said screw at the upper end being rigidly secured with a crosshead slidably engaging the reins, the nut above the plane of said box being formed with a worm gear constituting an extension of the nut, a shaft journaled in bearings on one side of the box and provided with a worm in mesh with the worm gear, a stub shaft rotatably mounted on the diametrically opposite side of the box, a spur gear mounted on said stub shaft, a pinion in mesh with the spur gear and mounted on the worm shaft, and means for imparting angular or turning movement to the stub shaft.

2. In a well drilling apparatus, a temper screw, a nut engaging the same, reins formed with a socket in which said nut is rotatably mounted, the screw having a crosshead secured to the same and slidably engaged with the reins, means for rotating the nut, and hand actuated means operatively connected with said first-named means and remotely positioned from the latter, the hand actuating means embodying a hand wheel for mounting on a derrick frame, a member operatively connected with said hand wheel, and operative connections between said member and said nut and embodying a longitudinally extensible shaft, and manually adjustable means for changing the position of said member to position it at substantially an intermediate point in the working range of the temper screw.

3. In a well drilling apparatus, a temper screw, means for suspending the same from a walking beam, a nut threadingly engaged with the temper screw and mounted for angular or turning movement to effect axial movement of the temper screw, means for rotating the nut, a hand operated means operatively connected with said first named means and remotely positioned from the latter and embodying a hand wheel for mounting on a derrick frame, a member operatively connected with said hand wheel, operative connections between said member and said nut including a longitudinally extensible shaft, and manually adjustable means for changing the position of said member to position it at substantially an intermediate point in the working range of the temper screw, said last named means comprising a rack bar connected with said member, a stud fixed with reference to the hand wheel, a pinion rotatably mounted on said stud, a crank handle connected with the pinion for rotating the latter, and means for applying a binding action on the pinion to preclude rotation.

4. In a well drilling apparatus, a temper screw, means for suspending the same from a walking beam, a nut threadingly engaged with the temper screw and mounted for angular or turning movement to effect axial movement of the temper screw, means for rotating the nut, a hand operated means operatively connected with said first named means and remotely positioned from the latter and embodying a hand wheel for mounting on a derrick frame, a member operatively connected with said hand wheel, operative connections between said member and said nut including a longitudinally extensible shaft, and manually adjustable means for changing the position of said member to position it at substantially an intermediate point in the working range of the temper screw, said last named means comprising a rack bar connected with said member, a stud fixed with reference to the hand wheel, a pinion rotatably mounted on said stud, a crank handle connected with the pinion for rotating the latter, and means for applying a binding action on the pinion to preclude rotation and embodying a nut threaded on the stud for movement toward and away from the pinion and provided with an actuating handle.

In testimony whereof I affix my signature.

RALPH V. KISSEL.